(12) United States Patent
Scheckelhoff et al.

(10) Patent No.: US 11,930,980 B2
(45) Date of Patent: Mar. 19, 2024

(54) APPLIANCE AND METHOD FOR CLEANING CONTEXT DETECTION

(71) Applicant: Haier US Appliance Solutions, Inc., Wilmington, DE (US)

(72) Inventors: Ryan James Scheckelhoff, Louisville, KY (US); Joshua Reeves, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 41 days.

(21) Appl. No.: 17/736,228

(22) Filed: May 4, 2022

(65) Prior Publication Data

US 2023/0355073 A1  Nov. 9, 2023

(51) Int. Cl.
*A47L 15/00* (2006.01)
*H04L 12/28* (2006.01)

(52) U.S. Cl.
CPC ....... *A47L 15/0049* (2013.01); *A47L 15/0063* (2013.01); *H04L 12/2814* (2013.01); *A47L 2501/26* (2013.01); *H04L 2012/285* (2013.01)

(58) Field of Classification Search
CPC ............. A47L 15/0049; A47L 15/0063; H04L 12/2814
See application file for complete search history.

(56) References Cited

U.S. PATENT DOCUMENTS

| 6,417,493 | B1 | 7/2002 | Bales et al. | |
|---|---|---|---|---|
| 7,937,716 | B2 * | 5/2011 | Betts | H04L 67/125 709/223 |
| 8,040,234 | B2 * | 10/2011 | Ebrom | H04L 63/105 340/531 |
| 8,849,430 | B2 * | 9/2014 | Elston, III | G04G 7/02 700/87 |
| 9,742,581 | B2 * | 8/2017 | Satanek | H04W 4/12 |
| 10,101,718 | B2 * | 10/2018 | Chien | G06F 3/0231 |
| 10,745,841 | B2 * | 8/2020 | Yoon | G06F 3/0482 |
| 11,115,231 | B2 * | 9/2021 | Satanek | H04W 4/12 |
| 11,352,729 | B2 * | 6/2022 | Kessler | A47L 15/0021 |
| 11,528,160 | B2 * | 12/2022 | Satanek | H04L 51/18 |
| 11,537,092 | B2 * | 12/2022 | Cha | F24F 11/0008 |
| 2002/0005787 | A1 * | 1/2002 | Gabai | H04B 1/202 340/12.29 |

(Continued)

FOREIGN PATENT DOCUMENTS

| CN | 106094541 A | 11/2016 |
|---|---|---|
| WO | WO2015091750 A1 | 6/2015 |

*Primary Examiner* — Albert K Wong
(74) *Attorney, Agent, or Firm* — Dority & Manning, P.A.

(57) ABSTRACT

A system and method for cleaning context detection and appliance operation are provided. The system includes a first appliance communicatively coupled to a second appliance to receive and transmit signals therebetween. The first appliance and the second appliance each include a controller configured to execute operations. The operations include receiving, at the first appliance, a first control signal corresponding to executing a cleaning mode at the first appliance; transmitting, from the first appliance, a second control signal to the second appliance, the second control signal corresponding to a cleaning state; and generating, at the second appliance, a third control signal corresponding to executing the cleaning mode at the second appliance.

20 Claims, 2 Drawing Sheets

(56) References Cited

U.S. PATENT DOCUMENTS

| | | | |
|---|---|---|---|
| 2002/0120728 A1* | 8/2002 | Braatz | H04L 9/40 |
| | | | 709/223 |
| 2008/0143490 A1* | 6/2008 | Elston | G06F 11/3495 |
| | | | 714/E11.202 |
| 2009/0063650 A1* | 3/2009 | Anslow | H04L 41/0853 |
| | | | 709/208 |
| 2014/0195064 A1 | 7/2014 | Lim | |
| 2017/0094014 A1* | 3/2017 | Nakatsukasa | H04L 67/12 |
| 2020/0187006 A1* | 6/2020 | Gary, Jr. | H04W 12/06 |
| 2021/0298557 A1 | 9/2021 | Budampati et al. | |
| 2022/0326675 A1* | 10/2022 | Wang | B05C 11/1042 |
| 2023/0121850 A1* | 4/2023 | Blackwood | A47L 15/4285 |
| | | | 134/57 D |
| 2023/0346192 A1* | 11/2023 | Uyeda | A47L 15/50 |

\* cited by examiner

APPLIANCE AND METHOD FOR CLEANING CONTEXT DETECTION

FIELD OF THE INVENTION

The present subject matter relates generally to consumer or commercial appliances, such as domestic appliances, and more particularly to systems and methods for appliance cleaning and operation.

BACKGROUND OF THE INVENTION

Conventional residential or commercial appliances require period cleaning and maintenance to help ensure proper functionality. Generally, a residence or commercial enterprise will have multiple appliances, each requiring cleaning and maintenance particular to each appliance. When appliances are not cleaned or maintained according to schedule or manufacturer recommendations, performance and operation may decline.

Accordingly, systems and methods for cleaning operation at multiple appliances is desired. More particularly, systems and methods for promoting cleaning and maintenance at multiple appliances is desired.

BRIEF DESCRIPTION OF THE INVENTION

Aspects and advantages of the invention will be set forth in part in the following description, or may be obvious from the description, or may be learned through practice of the invention.

An aspect of the present disclosure is directed to a computer-implemented method for operating a system of interconnected appliances. The method includes receiving, at a first appliance, a first control signal corresponding to executing a cleaning mode at the first appliance; transmitting, from the first appliance, a second control signal to a second appliance, the second control signal corresponding to a cleaning state; and generating, at the second appliance, a third control signal corresponding to executing the cleaning mode at the second appliance.

Another aspect of the present disclosure is directed to an interconnected system of appliances. The system includes a first appliance communicatively coupled to a second appliance to receive and transmit signals therebetween. The first appliance and the second appliance each include a controller configured to execute operations. The operations include receiving, at the first appliance, a first control signal corresponding to executing a cleaning mode at the first appliance; transmitting, from the first appliance, a second control signal to the second appliance, the second control signal corresponding to a cleaning state; and generating, at the second appliance, a third control signal corresponding to executing the cleaning mode at the second appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
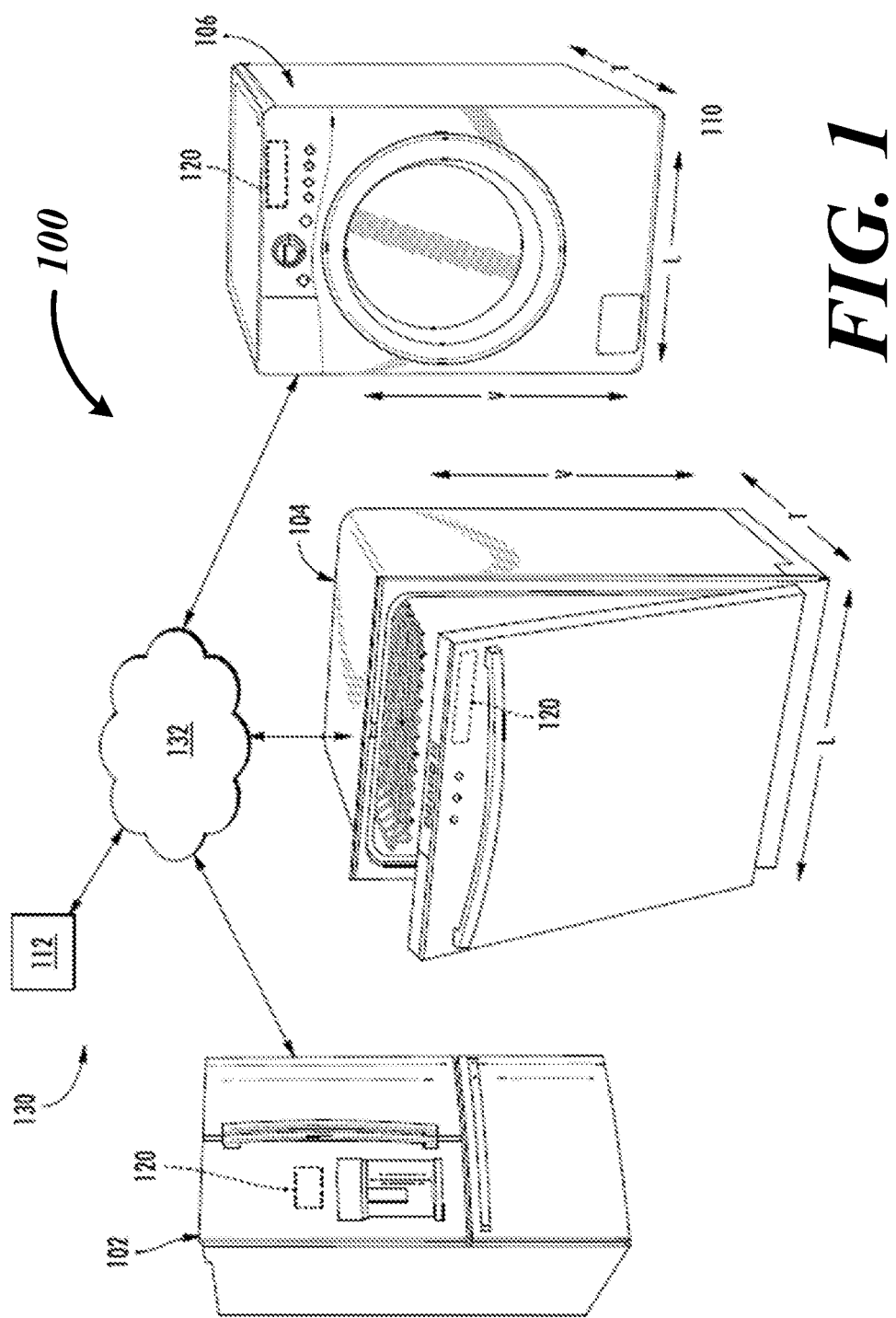
FIG. 1 provides a schematic diagram depicting the system executing steps of the method for operating a system of interconnected appliances in accordance with aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Referring now to FIG. 1, embodiments of interconnected system of appliances 100 will be described in accordance with exemplary embodiments of the present subject matter.

In general, system 100 may include any suitable number, type, and configuration of appliances, remote servers, network devices, and/or other external devices. System 100 may include a plurality of appliances 102, 104, 106 and may be able to communicate with each other or are otherwise interconnected. This interconnection, interlinking, and interoperability of multiple appliances and/or devices may commonly be referred to as "smart home" or "connected home" appliance interconnectivity.

FIG. 1 illustrates an interconnected system of appliances 100 according to exemplary embodiments of the present subject matter. As shown, system 100 generally includes a first appliance 102, a second appliance 104, a third appliance 106, etc., to an Nth appliance. The first appliance 102 is generally depicted as a refrigerator appliance. The second appliance 104 is generally depicted as a dishwashing appliance. The third appliance is generally depicted as a laundry washing and/or drying appliance. However, it should be appreciated that the appliances 102, 104, 106 may include any type of commercial and/or household appliance (e.g., cooking appliance, cleaning appliance, beverage appliance, freezer or refrigeration appliance, air conditioning and/or heating appliance, etc.), or combinations thereof. Details regarding the operation of the appliances 102, 104, 106 may be understood by one having ordinary skill in the art and detailed discussion is omitted herein for brevity. However, it should be appreciated that the specific appliance types and configurations are only exemplary and are provided to facilitate discussion regarding the use and operation of an exemplary system 100. The scope of the present subject matter is not limited to the number, type, and configurations of appliances set forth herein.

For example, system 100 may include any suitable number and type of appliances 102, 104, 106 such as "household appliances." These terms are used herein to describe appliances typically used or intended for common domestic tasks, e.g., such as the appliances as illustrated in the figures. According to still other embodiments, these "appliances" may include but are not limited to a refrigerator, a dishwasher, a microwave oven, a cooktop, an oven, a washing machine, a dryer, a water heater, a water filter or purifier, an air conditioner, a space heater, and any other household appliance which performs similar functions. Moreover, although only three appliances are illustrated, various embodiments of the present subject matter may also include another number of appliances, each of which may generate and store data.

In addition, it should be appreciated that system 100 may include one or more external devices, e.g., devices that are separate from or external to the one or more appliances, and which may be configured for facilitating communications with various appliances or other devices. For example, the system 100 may include or be communicatively coupled with a remote user interface device 110 that may be configured to allow user interaction with some or all appliances or other devices in the system 100.

In general, remote user interface device 110 may be any suitable device separate and apart from appliance 102, 104, 106 that is configured to provide and/or receive communications, information, data, or commands from a user. In this regard, remote user interface device 110 may be an additional user interface to the user interface panels of the various appliances within the system 100. In this regard, for example, the user interface device 110 may be a personal phone, a smartphone, a tablet, a laptop or personal computer, a wearable device, a smart home system, or another mobile or remote device. For example, the separate device may be a smartphone operable to store and run applications, also known as "apps," and the remote user interface device 110 be provided as a smartphone app.

As will be described in more detail below, some or all of the system 100 may include or be communicatively coupled with a remote server 112 that may be in operative communication with some or all appliances 102, 104, 106 within system 100. Thus, user interface device 110 and/or remote server 112 may refer to one or more devices that are not considered household appliances as used herein. In addition, devices such as a personal computer, router, network devices, and other similar devices whose primary functions are network communication and/or data processing are not considered household appliances as used herein.

As illustrated, appliance 102, 104, 106 remote user interface device 110, or any other devices or appliances in system 100 may include or be operably coupled to a controller, identified herein generally by reference numeral 120. As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 120 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 120 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 120 may be operable to execute programming instructions or micro-control code associated with an operating cycle of an appliance. In this regard, the instructions may be software or any set of instructions that when executed by the processing device, cause the processing device to perform operations, such as running one or more software applications, displaying a user interface, receiving user input, processing user input, etc. Moreover, it should be noted that controller 120 as disclosed herein is additionally, or alternatively, configured to store, execute, or otherwise operate or perform any one or more methods, method steps, or portions of methods as disclosed herein. For example, in some embodiments, methods disclosed herein may be embodied in programming instructions stored in the memory and executed by controller 120. The memory devices may also store data that can be retrieved, manipulated, created, or stored by the one or more processors or portions of controller 120. One or more database(s) can be connected to controller 120 through any suitable communication module, communication lines, or network(s).

Referring still to FIG. 1, a schematic diagram of an external communication system 130 will be described according to an exemplary embodiment of the present subject matter. In general, external communication system 130 is configured for permitting interaction, data transfer, and other communications between and among the appliance 102, 104, 106, remote user interface device 110, and the remote server 112. For example, this communication may be used to transmit packets of data through a network 132 and to the remote server 112 and to receive at one or more appliances a user input corresponding to a desired appliance function, including, but not limited to, user interface selections, primary or secondary function selections, functions associated with an operational parameter adjustment corresponding to one or more of operating parameters, cycle settings, user instructions or notifications, performance characteristics, user preferences, or any other suitable information for improved performance of one or more appliances within system 100.

In addition, remote server 112 may be in communication with an appliance and/or remote user interface device 110 through the network 132. In this regard, for example, remote server 112 may be a cloud-based server 112, and is thus located at a distant location, such as in a separate state, country, etc. According to an exemplary embodiment, remote user interface device 110 may communicate with a remote server 112 over network 132, such as the Internet, to transmit/receive data packets or information, provide user inputs, receive user notifications or instructions, interact with or control the appliance, etc. In addition, remote user interface device 110 and remote server 112 may communicate with the appliance to communicate similar information.

In general, communication between an appliance, remote user interface device 110, remote server 112, and/or other user devices or appliances may be carried using any type of wired or wireless connection and using any suitable type of communication network, non-limiting examples of which are provided below. For example, remote user interface device 110 may be in direct or indirect communication with the appliance through any suitable wired or wireless communication connections or interfaces, such as network 132. For example, network 132 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 130 is described herein according to an exemplary embodiment of the present subject matter. However, it should be appreciated that the exemplary functions and configurations of external communication system 130 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

In particular embodiments, each of appliances 102, 104, 106 may be configured to communicate directly with one another. Network 132 may include a router or commonly-connected network connection among the appliances 102, 104, 106, or a wireless connection directly between each appliance 102, 104, 106. In accordance with embodiments of the method provided further herein, each appliance 102, 104, 106, or particularly respective controllers 120 therefor, may be configured to receive and transmit signals to and among the plurality of interconnected appliances 102, 104, 106.

Now that the construction of system 100 and external communication system 130 have been presented according to exemplary embodiments, an exemplary method 1000 for data transmission and operation of a system of interconnected appliances (e.g., system 100) will be described. Although the discussion below refers to the exemplary method including data transmission or over-the-air (OTA) data transmission for any appropriate type of appliances, one skilled in the art will appreciate that the exemplary method is applicable to control function and the memory usage and/or data allocation of any suitable number, type, and configuration of appliances. In exemplary embodiments, the various method steps as disclosed herein may be performed by one or more controllers (e.g., such as controllers 120), one or more remote servers 112, or processes may occur at the remote server 112 or distributed across network computing devices interconnected in accordance with a network 132 such as described herein.

Figure 2:
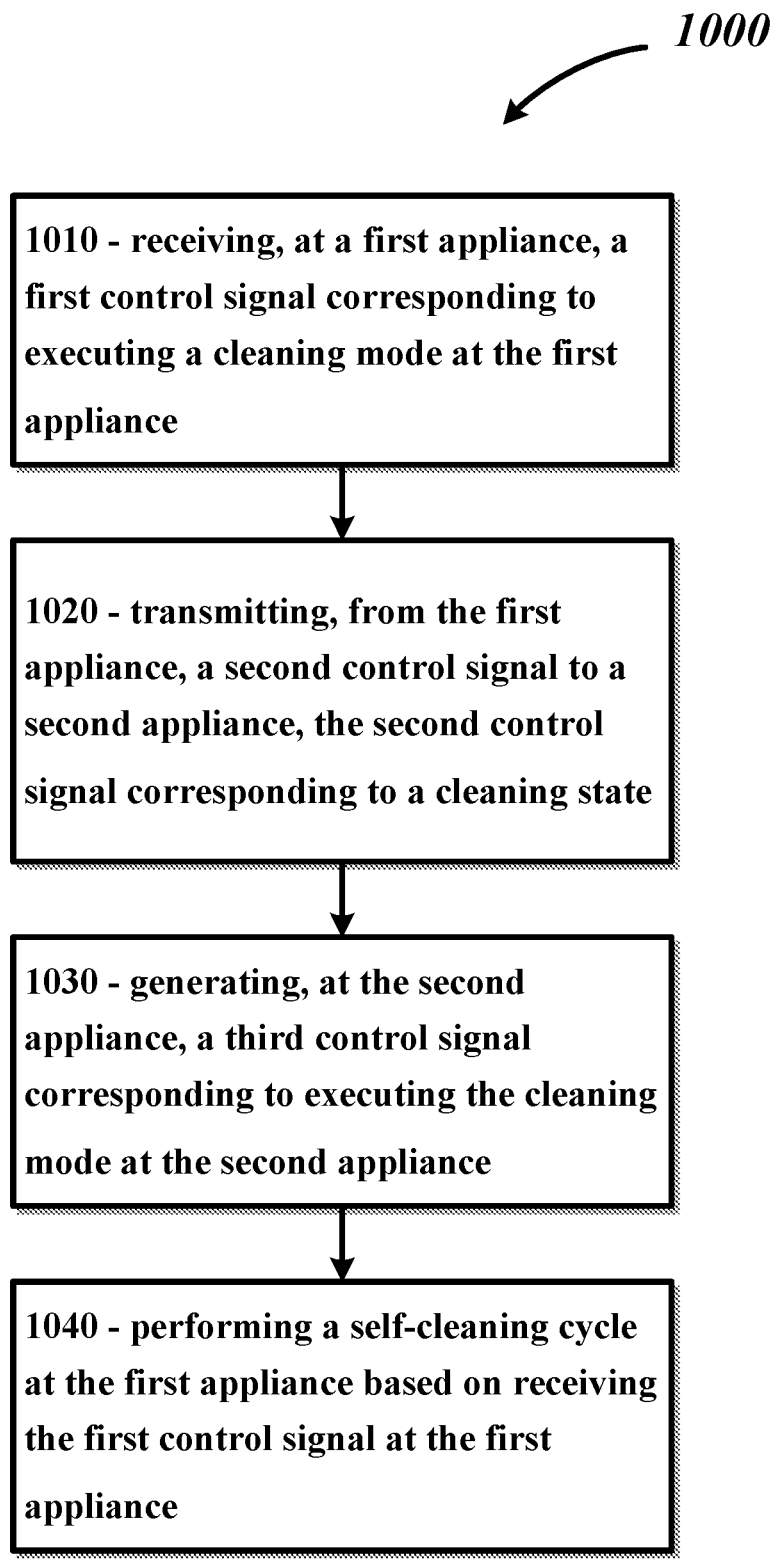
FIG. 2 provides a flowchart outlining steps of a method for operating a system of interconnected appliances in accordance with aspects of the present disclosure.

Referring now to FIG. 2, embodiments of a method for operating a system of interconnected appliances is provided (hereinafter, "method 1000"). Steps of the method may be stored as instructions or executed as operations by controller 120 at any one or more appliances such as described herein. However, it should be appreciated that embodiments of the method may be stored or performed at other appliances and networks without deviating from the scope of the subject matter.

Method 1000 includes at 1010 receiving, at a first appliance, a first control signal corresponding to executing a cleaning mode at the first appliance. Method 1000 includes at 1020 transmitting, from the first appliance, a second control signal to a second appliance, the second control signal corresponding to a cleaning state. Method 1000 includes at 1030 generating, at the second appliance, a third control signal corresponding to executing the cleaning mode at the second appliance.

In various embodiments, the first appliance may correspond to any one of appliances 102, 104, 106 such as described herein. The second appliance may generally correspond to any one or more other of the appliances of the interconnected system 100 such as described above. In certain embodiments, receiving the first control signal at the first appliance at step 1010 includes receiving a user input at the first appliance. The first appliance and the second appliance are operably coupled via a network (e.g., network 132) to transmit and receive signals to one another. The user input corresponds to the cleaning mode at the first appliance. In still particular embodiments, the cleaning mode is a self-cleaning mode or cycle at the appliance. For instance, the self-cleaning mode may include a fluid cycling operation, a heating cycle operation, or other appropriate self-cleaning cycle as may be known at an appliance. The first control signal corresponding to the cleaning mode at the first appliance may accordingly provide a cleaning context for the second appliance. In particular, the second control signal corresponding to a cleaning state may provide to the second appliance a cleaning context from the first appliance. For instance, the second control signal may indicate to the second appliance that the first appliance is undergoing a deep cleaning or other cleaning or maintenance cycle or task. Accordingly, a control signal is output at the second appliance that may indicate to the user that deep cleaning or other cleaning or maintenance cycle or task should be performed at the second appliance.

In particular embodiments, receiving the first control signal at the first appliance at step 1010 causes the first appliance to transmit the second control signal to the second appliance at step 1020. Accordingly, in various embodiments, when a self-cleaning cycle is executed at the first appliance, a second signal is transmitted to other appliances in the system of interconnected appliances indicative of a cleaning state. The cleaning state corresponds to any appropriate signal suggesting that a deep cleaning, self-cleaning cycle, maintenance task, or other periodic appliance cleaning or maintenance task is being performed, or requested by the user to be performed, at the first appliance. The control signal may correspond to executing respective self-cleaning modes at each appliance. In a still particular embodiment, method 1000 includes at 1040 performing a self-cleaning cycle at the first appliance based on receiving the first control signal at the first appliance. In certain embodiments such as described herein, receiving the first control signal, or particularly performing the self-cleaning cycle, at the first appliance causes the first appliance to transmit the second control signal to the second appliance.

In a still particular embodiment, at step 1030, the third control signal at the second appliance causes the second appliance to perform an appliance cleaning cycle at the second appliance. In various embodiments, the third control signal corresponds to a visual message or an audio message suggesting starting an appliance maintenance step at the second appliance. The appliance maintenance step may include or correspond to cleaning a component at the appliance, replacing a filter element at the appliance, cycling a cleaning solution at the appliance, performing a cleaning function at the appliance, or performing a manual operation by a user, or combinations thereof.

In some embodiments, such as at appliances at which a self-cleaning mode is unavailable, the third control signal corresponds to an output visual or audio message at the second appliance indicating to the user that cleaning is recommended for performance. As provided above, cleaning may include replacing a filter element, disassembly and/or cleaning of a component, or performing a manual cleaning activity at the appliance (e.g., wiping down particular surfaces or components, separately washing or cleaning certain components, replacing certain components, etc.). Accordingly, the third control signal may include a particular instruction to the user to perform a cleaning or maintenance task.

In still some embodiments, one or more of the control signals (e.g., first control signal, second control signal, third control signal, etc.) is provided to the remote user interface device 110. In a particular embodiment, the third control signal may include a maintenance or cleaning instruction corresponding to the appliance or particular components thereof. The third control signal may additionally, or alternatively, include a materials list corresponding to a cleaning solution, a tool, or a maintenance component for the appliance or components thereof. Providing the control signal to the device 110 may suggest to the user any desired or required items for cleaning and maintenance and allow the user to obtain cleaning or maintenance materials for the appliance accordingly.

It should be appreciated that cleaning modes and cleaning states corresponding to the control signals may particularly correspond to self-cleaning modes at the appliance, cleaning or maintenance signals to the user corresponding to the appliance, or other periodic cleaning or maintenance function such as described herein. The cleaning mode and cleaning state may particularly contrast with routine cleaning modes, such as dishwashing cycles for dishes, laundry washing cycles for laundry, or other cleaning tasks intended for objects, articles, or apparatuses separate from the appliance.

Embodiments of the system 100 and method 1000 provided herein may be utilized to synchronize deep cleaning (e.g., "spring cleaning") or maintenance tasks at appliances. Cleaning and maintenance may be performed substantially at the same time rather than performed at one appliance and potentially omitted at another. A user may obtain cleaning solutions, materials, or components in a single step for the plurality of appliances rather than in piece-wise steps, allowing for time and cost savings by the user. Synchronizing cleaning and maintenance across the interconnected system of appliances may furthermore promote cleaning and maintenance that may extend appliance life, performance, and operation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method for operating a system of interconnected appliances, the method comprising:
   receiving, at a first appliance, a first control signal corresponding to executing a cleaning mode at the first appliance;
   transmitting, from the first appliance, a second control signal to a second appliance, the second control signal corresponding to a cleaning state; and
   generating, at the second appliance, a third control signal corresponding to executing the cleaning mode at the second appliance.

2. The method of claim 1, wherein receiving the first control signal at the first appliance comprises receiving a user input at the first appliance, the user input corresponding to the cleaning mode at the first appliance.

3. The method of claim 1, wherein receiving the first control signal at the first appliance causes the first appliance to transmit the second control signal to the second appliance.

4. The method of claim 1, the method comprising:
   performing a self-cleaning cycle at the first appliance based on receiving the first control signal at the first appliance.

5. The method of claim 4, wherein performing the self-cleaning cycle at the first appliance causes the first appliance to transmit the second control signal to the second appliance.

6. The method of claim 5, wherein the third control signal at the second appliance causes the second appliance to perform an appliance cleaning cycle at the second appliance.

7. The method of claim 1, wherein the cleaning mode is a self-cleaning cycle.

8. The method of claim 1, wherein the first appliance and the second appliance are operably coupled via a network to transmit and receive signals to one another.

9. The method of claim 1, wherein the third control signal corresponds to a visual message or an audio message suggesting starting an appliance maintenance step at the second appliance.

10. The method of claim 9, wherein the appliance maintenance step corresponds to cleaning a component, replacing a filter element, cycling a cleaning solution at the appliance, performing a cleaning function at the appliance, or performing a manual operation by a user, or combinations thereof.

11. An interconnected system of appliances, the system comprising:
a first appliance communicatively coupled to a second appliance to receive and transmit signals therebetween, wherein the first appliance and the second appliance each comprise a controller configured to execute operations, the operations comprising:
receiving, at the first appliance, a first control signal corresponding to executing a cleaning mode at the first appliance;
transmitting, from the first appliance, a second control signal to the second appliance, the second control signal corresponding to a cleaning state; and
generating, at the second appliance, a third control signal corresponding to executing the cleaning mode at the second appliance.

12. The system of claim 11, wherein receiving the first control signal at the first appliance comprises receiving a user input at the first appliance, the user input corresponding to the cleaning mode at the first appliance.

13. The system of claim 11, wherein receiving the first control signal at the first appliance causes the first appliance to transmit the second control signal to the second appliance.

14. The system of claim 11, the operations comprising:
performing a self-cleaning cycle at the first appliance based on receiving the first control signal at the first appliance.

15. The system of claim 14, wherein performing the self-cleaning cycle at the first appliance causes the first appliance to transmit the second control signal to the second appliance.

16. The system of claim 15, wherein the third control signal at the second appliance causes the second appliance to perform an appliance cleaning cycle at the second appliance.

17. The system of claim 11, wherein the cleaning mode is a self-cleaning cycle.

18. The system of claim 11, wherein the first appliance and the second appliance are operably coupled via a network to transmit and receive signals to one another.

19. The system of claim 11, wherein the third control signal corresponds to a visual message or an audio message suggesting starting an appliance maintenance step at the second appliance.

20. The system of claim 19, wherein the appliance maintenance step corresponds to cleaning a component, replacing a filter element, cycling a cleaning solution at the appliance, performing a cleaning function at the appliance, or performing a manual operation by a user, or combinations thereof.

* * * * *